(12) United States Patent
Nguyen

(10) Patent No.: US 6,432,304 B1
(45) Date of Patent: Aug. 13, 2002

(54) REMOTE OPERATING BALLAST FILTER FOR VESSELS

(76) Inventor: Hap Nguyen, 15391 Purdy St., Westminster, CA (US) 92683

( * ) Notice: Subject to any disclaimer, the term of this patent is extended or adjusted under 35 U.S.C. 154(b) by 0 days.

(21) Appl. No.: 09/836,279

(22) Filed: Apr. 18, 2001

(51) Int. Cl.⁷ .......................... B10D 29/11; B10D 35/02
(52) U.S. Cl. .................. 210/172; 210/241; 210/242.1; 114/322; 114/125; 114/382
(58) Field of Search ............... 210/170, 172, 210/241, 242.1, 359, 459; 114/125, 183 R, 229, 322, 382

(56) References Cited

U.S. PATENT DOCUMENTS

| | | | | |
|---|---|---|---|---|
| 3,613,623 A | * | 10/1971 | Suzuki | 210/172 |
| 4,374,024 A | * | 2/1983 | Peloquin et al. | 210/172 |
| 5,049,287 A | * | 9/1991 | Pinder, III | 210/923 |
| 5,138,964 A | * | 8/1992 | Watson | 114/229 |
| 6,024,145 A | * | 2/2000 | Ackles | 210/242.1 |

* cited by examiner

*Primary Examiner*—Christopher Upton
(74) *Attorney, Agent, or Firm*—John P. Halvonik

(57) ABSTRACT

A remotely operated filtering system for ballast tanks used on naval vessels. A basket shaped filtering net is used in connection with the tanks and is controlled by a remote control operated by a human operator. The operator controls the movement and the operation of the filter when filtering is needed. The system includes a video monitor and an illumination means in connection with the filter structure.

2 Claims, 5 Drawing Sheets

REMOTE OPERATING BALLAST FILTER FOR VESSELS

FIELD AND BACKGROUND OF THE INVENTION

The invention relates to the field of vessels and navigation and in particular to a system for filtering out aquatic nuisance species that may permeate the ballast tanks of ships and cause infestations of non indigenous plants and animals to an area that the ship travels to.

Such aquatic nuisance species include both plants and animals. Animals such as zebra mussels have caused prolonged ecological changes in the Great Lakes and major rivers of the central United States. Other invading species of fish (e.g. sea lamprey, ruffe and round goby) can harm native fish and threaten sport and commercial fishing industries.

Plants such as purple loosetrife, Eurasian watermilfoil and hydrilla can also cause problems as they can quickly replace native plants and/or impair recreational activities, navigation and flood control, as well as degrade water quality and fish and wildlife habitats. This can result in the filling up of lakes and depressing land values. Other risks include possible health risks involving the spreading of for example cholera bacteria and other strains.

Aquatic pests are typically caught in the ballast tanks of ocean going and other types of vessels. They are taken in; stowed away and then discharged from ballast tanks of cargo and ocean going ships of all types.

The purpose of the system is to filter out exotic species and thus prevent them form getting into a ship's ballast tanks. If adopted, such a system will prevent or minimize this sort of damage to marine environments. If adopted for international use, the present trend of damage in the US and abroad could be curbed or abated.

Since ballast tank intake ports are below the water line, a maneuverable filter is needed. The system therefore is designed around a navigable platform to which the filters are attached. The platform is operated by remote control using a hand held control panel connected to the platform via an umbilical cord.

With a filtering unit thus equipped on the ballast tanks, the process of cleaning out such tanks on ships may be made easier and safer and thus it will be possible to clean out such tanks on a more regular basis that is the case nowadays. By the use of remote sensing equipment such as video cameras and a lighting means the operator of such a remote device may control the movement of the filtering device and manipulate the position of the device until it can be docked with the ballast tank through the use of electromagnetic devices.

SUMMARY OF THE INVENTION

The invention is a system for filtering aquatic pests from the ballast tanks of naval vessels. The invention comprises a basket shaped filtering net at one end of the operation in connection with a remote control operating system at the other end. A human operator is at the remote control end where he controls the movement and the operation of the filter when filtering is needed.

The filter end of the system includes a basket shaped member for filtering out waterborne organisms that flourish in the ballast tanks of the vessel. The filter member has a sensing means including a video monitor for viewing the immediate area in and about the ballast tanks and an illumination means in connection with the filter structure. Both the video camera and the illuminating means are controlled from a remote location and are preferably operated in terms of their orientation of such as well as the on and off operation of them.

The remote operator is in communication with the sensors through an umbilical cord that links the filter portion of the invention with the operating controls for the pilot. In addition, there are electromechanical means at the filter end that are operated remotely and are used to connect the filter to the intake and discharge ports in the ballast tank.

Other monitoring sub systems in the invention include a wave monitor and a GPS system for monitoring the location of the vessel. The locating system is used to periodically filter the ballast tanks when the vessel is nearing a port of entry when such vessel is at a predetermined distance from the port. The wave monitor will cut off power to the system and disable its operation in the event that the action of the filter may endanger the ship due to the size of the wave action.

An object of the invention is to provide a means for filtering out water borne pests out from the ballast tanks of naval vessels by a remote operator at such times as it may become necessary to remove such pests.

Another object of the invention is provide a method for removing water borne pests from the ballast tanks of naval vessels by remote operation.

Another object of the invention is to provide a means for safely filtering out water borne pests from naval vessels at selected times during the voyage of the vessel.

Another objects will be apparent to those skilled in the art once the invention is shown and described.

DESCRIPTION OF THE PREFERRED EMBODIMENT

Figure 1:
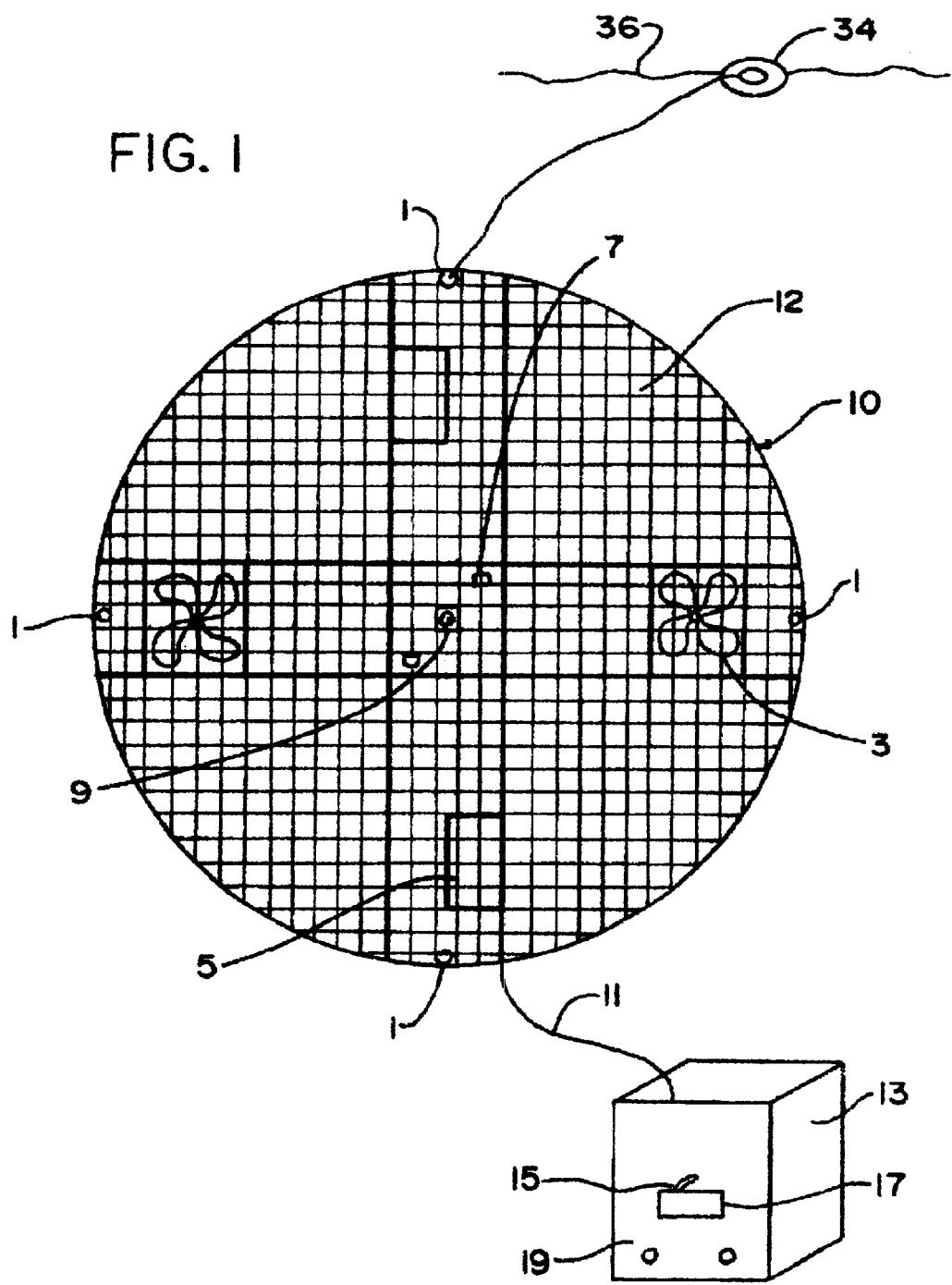
FIG. 1 overall view of system in use near ballast tank.

The system is shown in FIG. 1. The overall shape of the filter 12 may be viewed as that of a basket. However, the filter is approximately 10 feet in diameter to accommodate the flow of the water into and out of the ports. The water line 36 is that of the water in the ballast tank.

The outer ring of the filter support frame 10 may be rubber coated and made of fiberglass or other composite material that can tolerate salt water. The height of the platform should be about 4 feet and the structure may weigh less than 50 lbs, when readily available, light weight materials are used in the construction.

This filter has in connection certain sensing equipment, and electromagnetic equipment as well as a global positioning system and wave sensing system.

The components at this end of the system are connected to a remote control unit shown as 13 in FIG. 1. This connection is via the umbilical cord 11 in FIG. 1. This figure is not shown to scale as it is likely that the length of the umbilical cord will allow the remote control unit to be operated some distance away from the ballast tank where the filter will be operating.

There are a series of remotely operable electromagnets (shown as 1) at each corner of the filter shown in FIG. 1. It is preferred that four electromagnets be used but this number may be varied more or less according to the specific needs of the ship that the system is used on.

Use of the electromagnets allows the filter to be temporarily attached to the intake and discharge ports in the ballast tanks of the ship when the system is in use. The electromagnets are operated remotely by an operator through the umbilical cord electrical connection.

The electromagnets would preferably be of the sort that can be turned off and on so that there is no magnet force effect when the electromagnets are not in operation. The umbilical connection in this case may simply be an electrical connection for providing signals from the remote control unit 13 to the electromagnets in order to turn them off and on.

Figure 6:
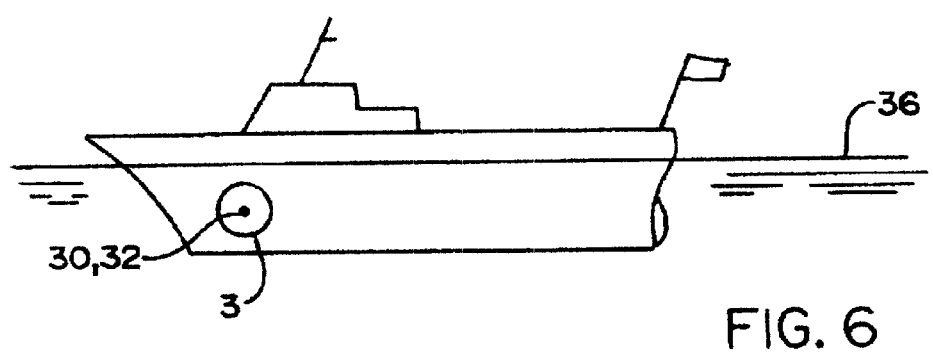
FIG. 6 position of system vis a vis the ship.
Figure 7:
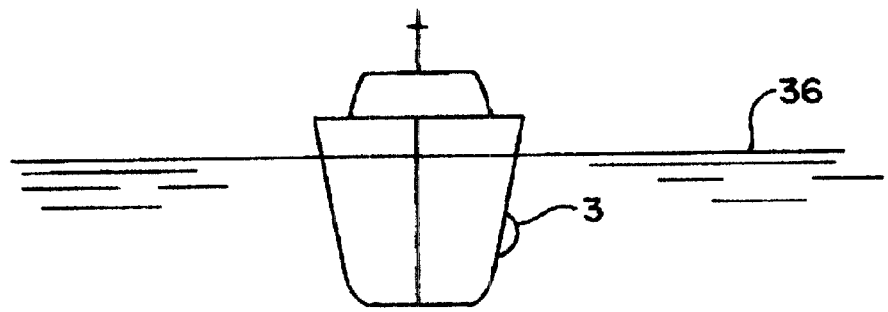
FIG. 7 view of ship and system from the side.

The ballast ports of the ship are holes in the sides of the ship. They are usually below the waterline 36. The system will dock sideways and parallel to the ship's hull and cover the port. See FIGS. 6 and 7.

When the filter is near the intake 30 or discharge port 32, electromagnets 1 are activated to temporarily lock the platform into place. Upon completion of the intake ballast procedure, the system will be lifted onto the ship's deck and the intake filter can then be removed.

Figure 2:
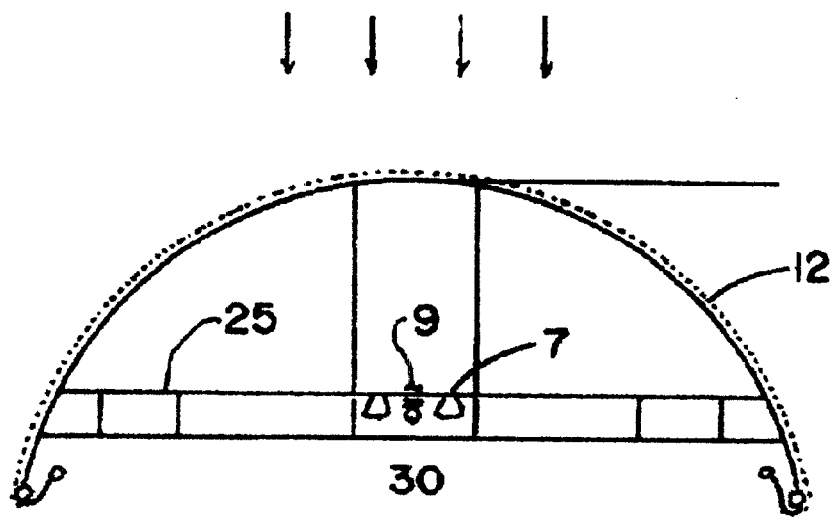
FIG. 2 intake filter layout cross section.

When it is in the intake procedure, the filter will cover the outside of the platform (see FIG. 2). Water has to go through the filter through the intake port 30 and then enters the ballast tank.

Marine organisms entrapped by the filter will perish after approximately 20–30 minutes of atmospheric exposure. The remnants can then be disposed of in the same manner as other organic waste. A marine larvae is approximately one millimeter in size. Therefore, the pores of the filter are one half of one millimeter (0.5 mm). If the need arises, the pores can be made even smaller (See FIG. 5).

When in the discharge mode, the filter is lined inside the platform. Water is pumped out from the ballast tank via the ballast port 32 through the discharge filter 12 and then out of the platform. See FIG. 3.

Before the ship departs, the system 3 including the net and its support structure, camera, lights, etc. is lowered into the water. See FIGS. 6 and 7. The operator using the control panel maneuvers it into position over the intake or discharge port with the aid of the platforms search lights, video camera and thrusters. Note vertical thrusters shown as 5 and horizontal thrusters shown as 3 in FIG. 1. The intake procedure described above would be used at this time. The discharge mode would be used when the ship has made port or final destination.

The magnets can be turned off when not in use so that the filter can be moved to another location in the tank. In addition to the electromagnets the system includes a sensoring system used to transmit images of the area in the ballast tank back to the remote operator.

The system will have a lighting means or spot light 7 shown in FIG. 1 as well as the video camera 9 shown in FIG. 1. It is preferred that there be at least two spotlights on the filter structure but more or less lights may be used without varying from the spirit of the invention. The lights may be used when operating at night or in dark water. They are activated by the operator through the umbilical connection shown as 11 in FIG. 1.

The video camera 9 records images of the area in the ballast tank and relays that information back to the operator via the umbilical connection. The connection allows the images to travel via some sort of televised signal that transmits the image in the camera and displays it upon the monitor 17 shown in FIG. 1. The monitor may have an LED display (light emitting diode display).

The system will likely be powered by a 12 volt DC source in the form of a battery or a similar power source.

By watching the view on the monitor, the operator can manipulate the position of the filter by using the thrusters (3 and 5 in FIG. 1) so that it will align with the ballast port(s). There would preferably be two horizontal thrusters to move the platform fore and aft as well as two vertical thrusters to move the platform up and down.

Thus, the operator can manipulate the movement of the filter until it is near the intake/discharge ports and can be docked to them using the electromagnetic switch 19 that controls the on/off operation of the electromagnets. The unit will now be docked to the ports and the filtering operation can be commenced.

The orientation of both the lights and the camera may be controlled by the operator using the joystick control 15 in FIG. 1. A control panel may be used to control alternate operation of either the lights or the camera at different times. The operator would manipulate the orientation (such as the angle) of the lights and camera via his remote control. This will allow the operator to view the area of the intake and discharge ports when the filter is ready to be used.

Figure 3:
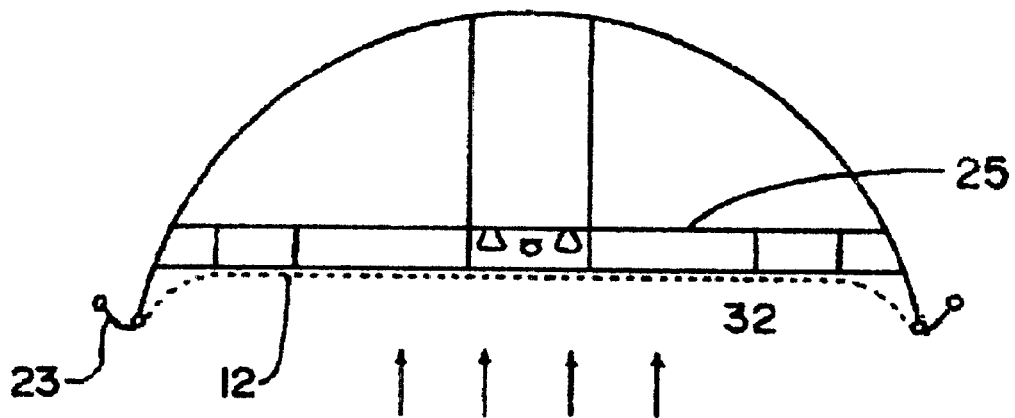
FIG. 3 discharge filter layout cross section.

The movement of the water during such filtering operation is shown FIGS. 2 and 3. FIG. 2 illustrates the downward flow of water toward an intake port and FIG. 3 shows the upward flow when the filter is used on a discharge port. The elastic is shown on the edges of the filter to keep it tight over the port.

There is a safety float means shown in FIG. 1 that is used to provide a safeguard in the event that the filter becomes unmanageable by the remote operator. The float means would be mechanical in nature so that it does not have to be turned off and on in order to work it. In the event that the device becomes unmanageable by the operator the float would be used to move the platform in the water.

Figure 5:
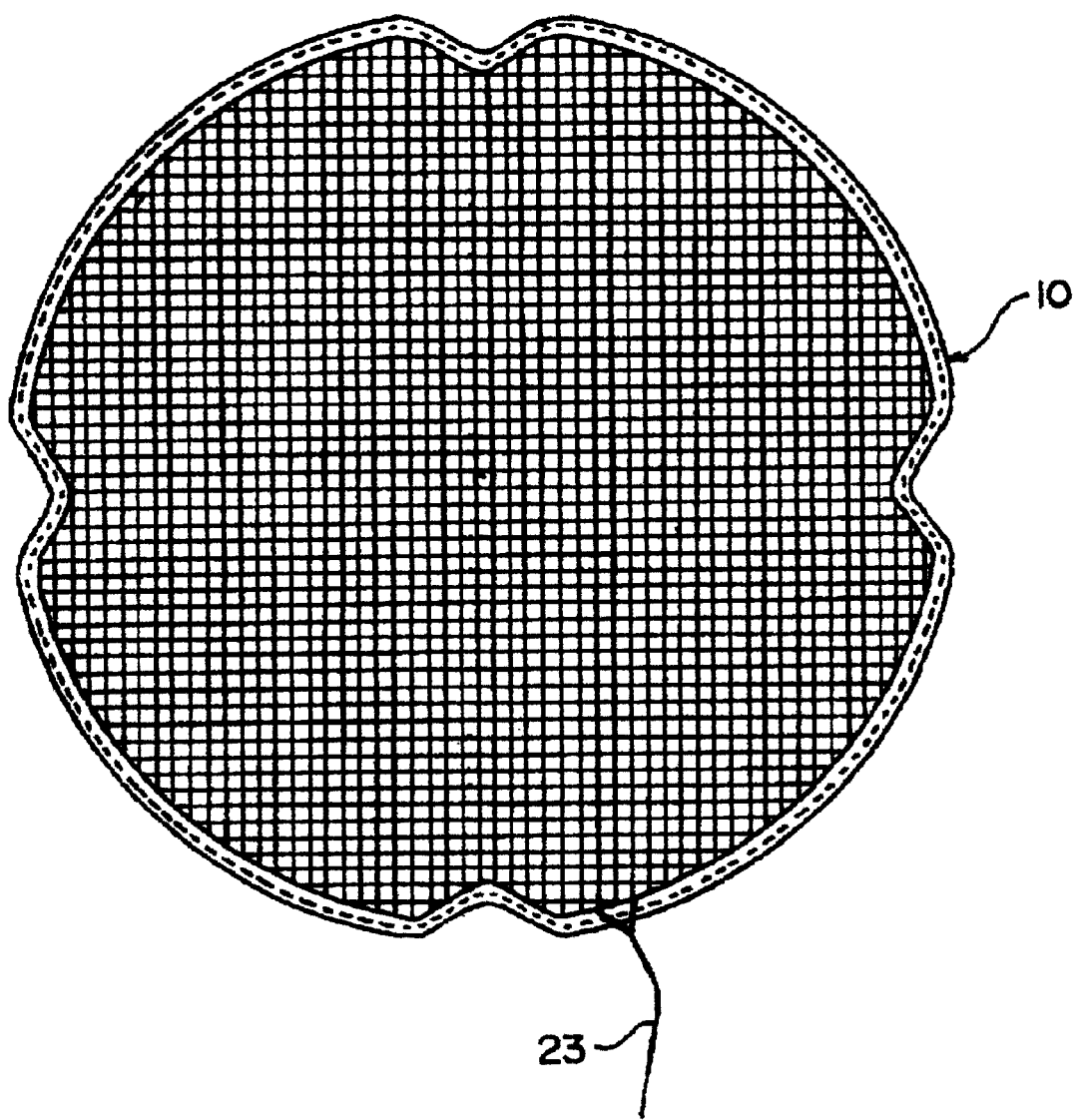
FIG. 5 discharge filter.

FIG. 5 shows more details of the net including the draw string or draw line 23. The draw string is in connection with the outer perimeter or edge of the filter. It is used to close the filter up in a package after the filtering process and so keep the contents (the waterborne pests) inside the filter so that the pests and/or filter can be disposed of. The filter is hauled out of the ballast tank when it has been used. The filter may be reusable or not.

Figure 4:
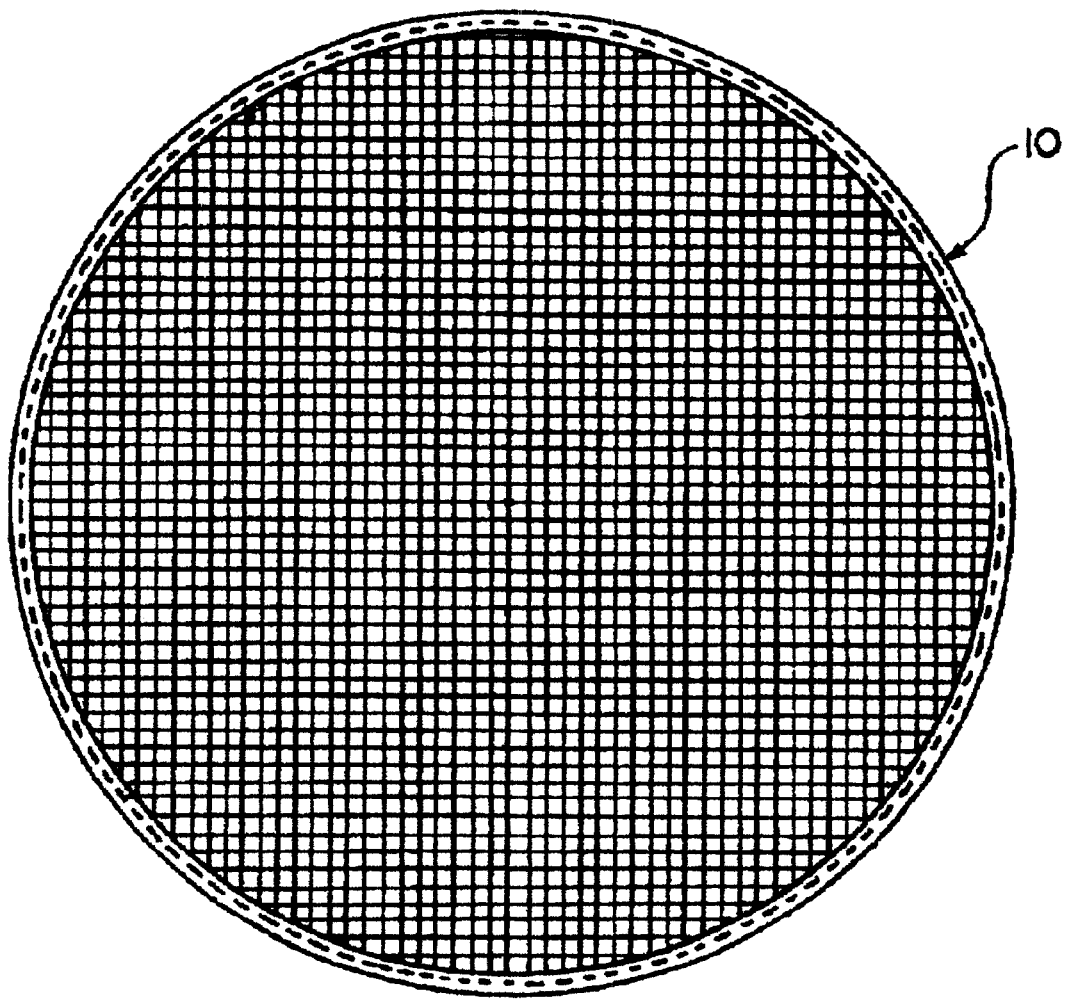
FIG. 4 intake filter and drawstring.

The elastic bands 25 are sewn across outer edge or outer perimeter of the filter as seen in FIG. 4. These will help to keep the filter closed once the filter is removed from the framework. The bands may be made of any suitable material that will keep them in a resilient mode. The bands may be sewn into place. The bands would preferably be about 9 feet long and perhaps 6" in width

I claim:

1. A system for remotely straining water contained in ballast tanks that are used in connection with water borne vessels; such system comprising: an intake filter portion, said intake filter portion including a basket shaped structure having a means for supporting a filter in water and thruster means for moving said structure through water;

sensing equipment in connection with said basket shaped structure, comprising a video camera means for transmitting views of the area heat said filter back to a remote location and a means for illuminating the area near said filter;

said filter having an electromagnetic means in connection with said filter for generating a magnetic force upon the direction of a remote operator;

a remote control unit having means for monitoring the view in said video camera, means for operating said thrusters to control the movement of said apparatus in said ballast tank, means for turning off and on said electromagnetic means, and means for controlling the orientation and the on/off operation of said illuminating means; and an umbilical cord connecting said remote control unit with said sensing equipment, said electromagnetic means and said thruster means.

2. The invention of claim 1 having a global positioning means for tracking the location of said vessel and for periodically operating said filtering means when said vessel comes within a predetermined distance of a given port for the vessel.

\* \* \* \* \*